June 7, 1938.  S. J. CARROLL  2,119,702
FILM MANUFACTURE
Filed Aug. 7, 1936
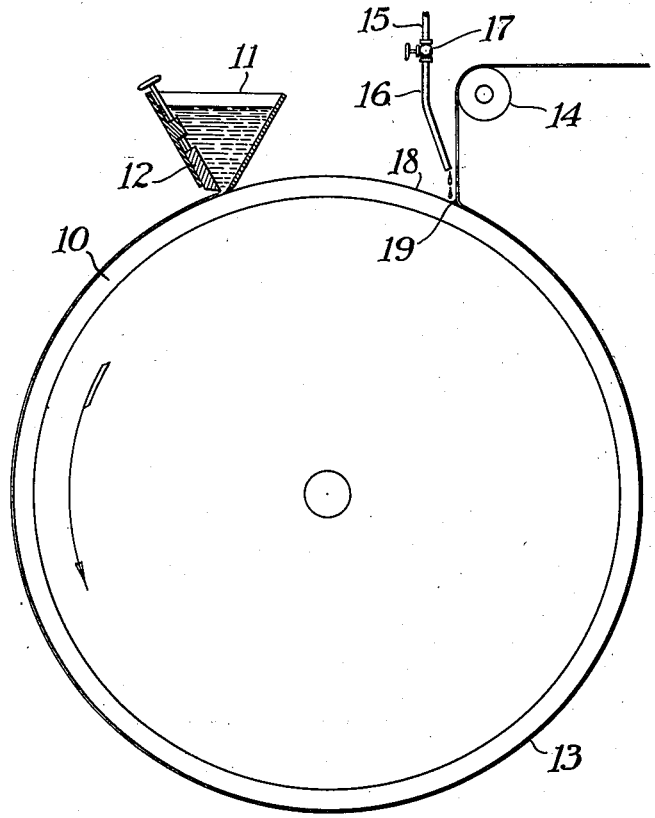
FIG. 1.
FIG. 2.
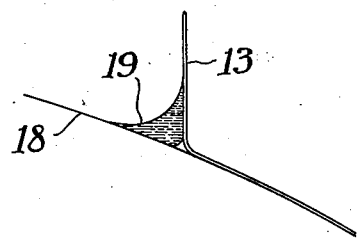
FIG. 3.
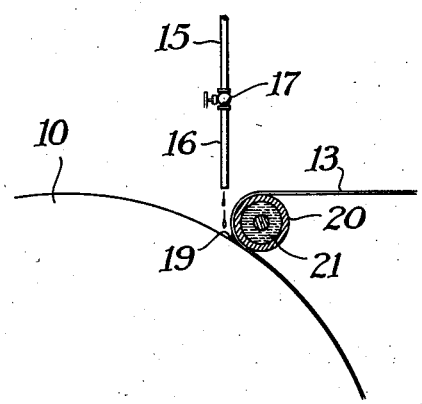
INVENTOR.
Stewart J. Carroll
BY Newton M. Perrins
Daniel J. Mayne
ATTORNEYS Patented June 7, 1938

2,119,702

UNITED STATES PATENT OFFICE 2,119,702

FILM MANUFACTURE

Stewart J. Carroll, Rochester, N. Y., assignor, by mesne assignments, to Eastman Kodak Company, Jersey City, N. J., a corporation of New Jersey Application August 7, 1936, Serial No. 94,835

4 Claims. (Cl. 18—57)

This invention relates to the manufacture of sheets or films composed of cellulose esters and ethers and various other colloidal materials. More particularly, the invention relates to a method of facilitating the removal of such sheets or films from the surface upon which they are formed.

As is well-known, various types of film and sheeting are usually made by depositing a solution or dope composed of a colloidal material, such as a cellulose ester or ether, in a thin layer on the surface of a slowly rotating wheel or drum, or by depositing the material on the surface of an endless metallic band, removing solvents from the deposited material by means of heated air or other coagulating media and finally stripping the coagulated material from the film-forming surface in a continuous sheet. Notwithstanding that the bulk of the solvent has been removed from the film when it reaches the point where it is stripped from the film-forming surface, it nevertheless retains a small amount thereof. If this amount of solvent is above a certain critical value, the film will strip steadily and cleanly from the coating surface, but the amount of solvent present in the film under such circumstances is much too high for practical purposes, since it must be subsequently removed before the film is fit for commercial use. The removal of such considerable amounts of residual solvent presents various disadvantages and are likely to cause defects in the film structure itself. On the other hand, if the residual solvent content is below the critical value, the film adheres so tenaciously to the film-forming surface that it can be removed therefrom only by the application of considerable force. This causes the film to strip from the surface in jerks, giving rise to the phenomenon known as "snap lines" on the film surface which renders it defective for photographic and other uses where practically perfect transparency is required. The adhesion may in some cases be so great as to cause small portions of the film to be torn away from the main body of the material and left upon the film-forming surface.

The present invention has as its principal object to obviate the above-mentioned difficulties in the manufacture of sheets or films from colloidal materials, such as cellulose derivatives and the like, and to provide a means whereby such films may be stripped from a film-forming surface without the production of snap lines or similar optical defects. Another object is to provide an improved method of stripping cellulose derivative and other films from the surface of a coating wheel or other device commonly employed in the film industry. Other objects will appear hereinafter.

These objects are accomplished by the following invention which, in its broader aspects, comprises casting the film in the usual manner, causing the film to set by evaporating solvents therefrom and then applying a bead of liquid at the point at which the film is stripped from the film-forming surface. I have found that when employing a wheel for casting the film, if a liquid which is non-solvent with respect to the film material, such as cold water, is placed in the V-shaped opening formed between the wheel surface and the inner surface of the film as it leaves the wheel, the film breaks away from the surface sharply without sticking, stretching, or the production of snap lines in the product.

In the following examples and description I have set forth several of the preferred embodiments of my invention but they are included merely for purposes of illustration and not as a limitation thereof.

In the accompanying drawing in which like reference characters refer to like parts, Fig. 1 is a schematic, elevational view of a machine adapted for the production of films composed of colloidal materials such as cellulose derivatives and the like, and illustrating the manner in which the film is removed from the film-forming surface in accordance with the present invention.

Fig. 2 is an enlarged fragmentary view more fully illustrating the action of the liquid bead in facilitating removal of the film from the film-forming surface.

Fig. 3 is another fragmentary view similar to that of Fig. 2 illustrating the use of a chill roll in conjunction with a liquid bead.

In carrying out my invention I maintain a bead of non-solvent liquid in the crevice between the stripped film and the surface upon which it is formed. I have found that water, for example, serves the purpose very well, although other non-solvent liquids may be employed. I have found that especially desirable results are obtained if the water or other liquid is applied in a cool or cold condition, the film apparently being cooled thereby and stripping more readily in that condition. Supplemental cooling by means of a chill roll or other device applied as indicated in Fig. 3 is sometimes desirable from the standpoint of further increasing the ease of stripping.

As indicated, the material employed for producing the bead should be a liquid which has no substantial solvent action upon the material of which the film is formed and should, of course, be substantially non-corrosive with respect to the metallic surface of the coating wheel or other device upon which the film is formed. In the manufacture of cellulose derivative and other types of film I find that water serves the purpose especially well, since it has no solvent action on the film material. Furthermore, water has the added advantage that it exerts a slight solvent extracting or curing effect on the film. Other liquids which may be used in accordance with the invention are members of the aliphatic series of hydrocarbons, such as hexane, heptane, octane, etc.; various aromatic hydrocarbons such as benzene and toluene. In connection with the stripping of cellulose acetate film, ethyl alcohol or methyl alcohol may be satisfactorily employed.

While I prefer to use cold water, that is, water cooled substantially below room temperature, the matter of temperature does not appear to be critical. In some cases it may even be desirable to use water at temperatures above room temperature, while in other cases the temperature of the liquid may be close to the freezing point. In either case the effect obtained is substantially the same, namely, perfect stripping of the film without sticking to the film-forming surface and without the production of snap lines or other undesirable defects in the film which would adversely affect its transparency.

At this point, it is desirable to point out that the action of the liquid bead is apparently not due to any difference between the temperature of the liquid and that of the film material. Its action is more akin to a mechanical action in that it causes the clean-cut separation of the film material from the coating surface independently of any thermal or chemical action. While I offer no theoretical explanation to account for the phenomenon, it appears that the results obtained are due to some type of physical force acting between the liquid bead, the metal film-forming surface and the film material itself.

My invention will be more readily understood by reference to the accompanying drawing. In Fig. 1, the numeral 10 designates a coating wheel of a conventional type such as used in the film manufacturing industry. This wheel receives from the hopper 11, a viscous solution or dope comprising a cellulose derivative such as cellulose nitrate or cellulose acetate dissolved in appropriate solvents. The dope is caused to flow upon the polished wheel surface at such a depth and speed as will produce a finished film 13 of the desired thickness, the depth of the dope at the hopper, and indirectly the thickness of the film, being controlled by means of a gate 12 in known manner. The wheel rotates slowly in the direction indicated by the arrow, while a current of heated air or other coagulating media is circulated around the wheel surface, preferably in a direction counter-current to the direction of rotation, whereby solvents are removed from the film. The customary enclosure or housing for the wheel through which the air circulates is not shown in the drawing, being of a conventional design well-known in the art. The film is detached or stripped from the film-forming surface when the wheel 10 has passed through about three-fourths of a revolution, being guided over guide roll 14 and thence to an appropriate drying or curing apparatus (not shown).

In accordance with the invention, a suitable supply of water or other non-solvent liquid is supplied from a suitable source through the pipe 15 which terminates in an outlet 16, the flow of liquid being controlled by the valve 17. The water is permitted to drop from the outlet 16 into the V-shaped opening formed between the film-forming surface 18 and the inside surface of the film 13, thus maintaining a constant liquid bead at approximately the exact point of stripping. The supply of liquid may be continuous or intermittent, this being immaterial so long as the bead is maintained. No great amount of liquid need be permitted to accumulate in the V, a relatively fine bead apparently being as effective as a large bead.

In Fig. 2, I have illustrated in enlarged section, the further action of the liquid bead in separating the film from the film-forming surface. It will be evident that in some way the theoretical explanation of which is not clear, the bead 19 has a very definite and positive action in splitting the film away from the film-forming surface. This is remarkable and wholly unexpected when one considers the fact that water is a very mobile and easily deformable liquid.

In Fig. 3, I have illustrated the stripping of a film by a method which involves both the application of the liquid bead and the use of a chill roll. In this method the liquid bead is maintained in the V-shaped opening between the film and the film-forming surface as previously described, but a cold roll 20, preferably a hollow roll supplied with a low temperature brine 21, or other suitably cooled medium is applied to the outside surface of the film at the point of stripping. This tends further to harden or set the film before actual stripping occurs.

As indicated above, many changes may be made in the above method of carrying out the process herein described within the scope of my invention. Various types of liquids may be employed so long as they do not have any adverse solvent or other effect on either the film itself or the machinery. Water is eminently suitable for the purpose for the reasons previously alluded to. My invention is broadly applicable to the stripping of films made from various colloidal materials such as those composed of cellulose derivatives such as cellulose nitrate, cellulose acetate, cellulose propionate, cellulose butyrate, cellulose acetate propionate, cellulose acetate butyrate, cellulose acetate stearate, the cellulose ethers, and many others. This method has also been found to be of particular importance in connection with the manufacture of films composed of resinous materials, particularly films of the vinyl or vinyl acetal types. These materials, due to their peculiar properties, present rather difficult problems of coating, stripping and curing which are overcome by this invention.

It will also be evident that my invention is not limited to the stripping of films formed on wheel surfaces, but may also be applied to the manufacture of films by coating appropriate solutions on endless metallic bands, it being obvious that a bead of liquid may be maintained at the point of stripping in such devices as well as in the case of casting wheel devices.

The facility with which a given film may be stripped from a casting surface depends upon a number of factors such as the particular type of cellulose derivative employed in the film, the type of solvent used in making up the film forming dope, the particular plasticizers used, the speed of casting and the type of casting surface. It will thus be readily understood that the critical solvent content of the film, that is, the amount of solvent which it may contain and still be made to strip cleanly from the casting surface, is variable. In some cases this critical solvent content may be close to zero, while in other cases it may be as high as 10 or 15%, but whether the amount is small or large, the application of the liquid bead in accordance with my invention causes the film to strip cleanly and without snap lines. As a matter of fact, I have found that some types of dopes, particularly cellulose acetate dopes, when cast upon a glass surface, for example, tend to stick so tenaciously thereto that it is impossible to remove them from the casting surface by ordinary means without ruining the film. Nevertheless, such films may be quite readily removed by the application of a water bead in accordance with my invention, the bead causing the film to immediately lift from the surface without any adverse effects on the film surface.

What I claim is:

1. The process of producing a sheet or film which comprises casting a solution of a colloidal material in the form of a film on a film-forming surface, removing solvent therefrom and stripping the film from the surface in a direction which provides an approximately V-shaped crevice between the film and the surface in which the vertex of the V is at least as low as any other point in the V, and maintaining a supply of a non-solvent liquid in the crevice by gravity.

2. The process of producing a sheet or film which comprises casting a solution of a colloidal material in the form of a film on a continuously moving film-forming surface, removing solvent therefrom and stripping the film from the surface in a direction which provides an approximately V-shaped crevice between the film and the surface in which the vertex of the V is at least as low as any other point in the V, and maintaining a supply of a non-solvent liquid in the crevice by gravity.

3. The process of producing a sheet or film which comprises casting a solution of a water-insoluble colloidal material in the form of a film on a continuously moving film-forming surface, removing solvent therefrom and stripping the film from the surface in a direction which provides an approximately V-shaped crevice between the film and the surface in which the vertex of the V is at least as low as any other point in the V, and maintaining a supply of water in the crevice by gravity.

4. The process of producing a sheet or film which comprising casting a solution of hydrocarbon-insoluble colloidal material in the form of a film on a continuously moving film-forming surface, removing solvent therefrom and stripping the film from the surface in a direction which provides an approximately V-shaped crevice between the film and the surface in which the vertex of the V is at least as low as any other point in the V, and maintaining a supply of a non-solvent hydrocarbon liquid in the crevice by gravity.

STEWART J. CARROLL.